June 1, 1965 M. H. O'LINK 3,186,674
BOAT SEAT SUSPENSION SYSTEM
Filed May 28, 1963 2 Sheets-Sheet 2
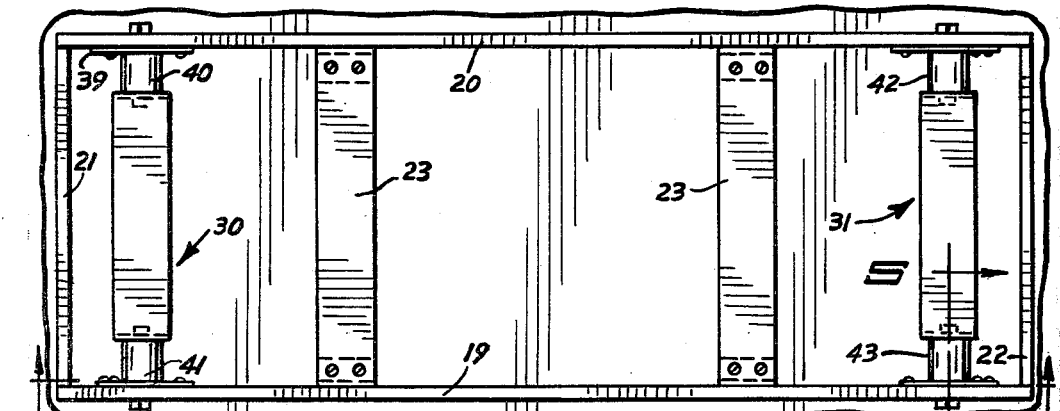
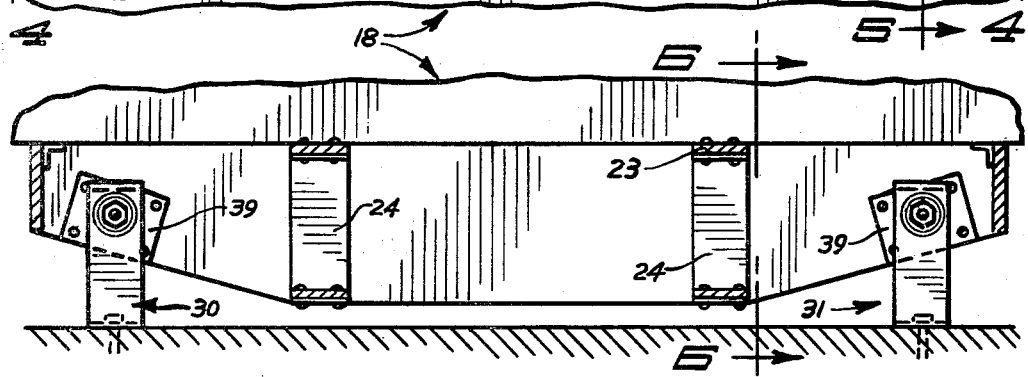
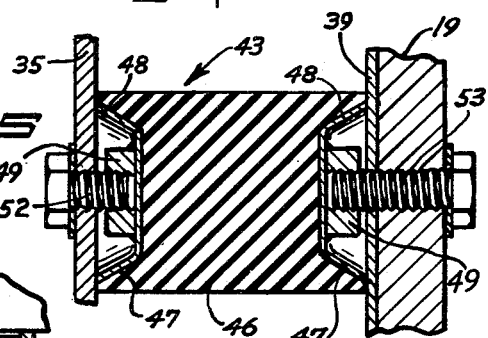
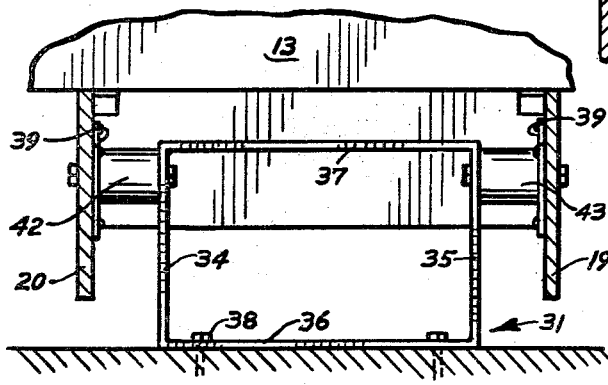
INVENTOR.
MAURICE H. O'LINK
BY
ATTORNEYS

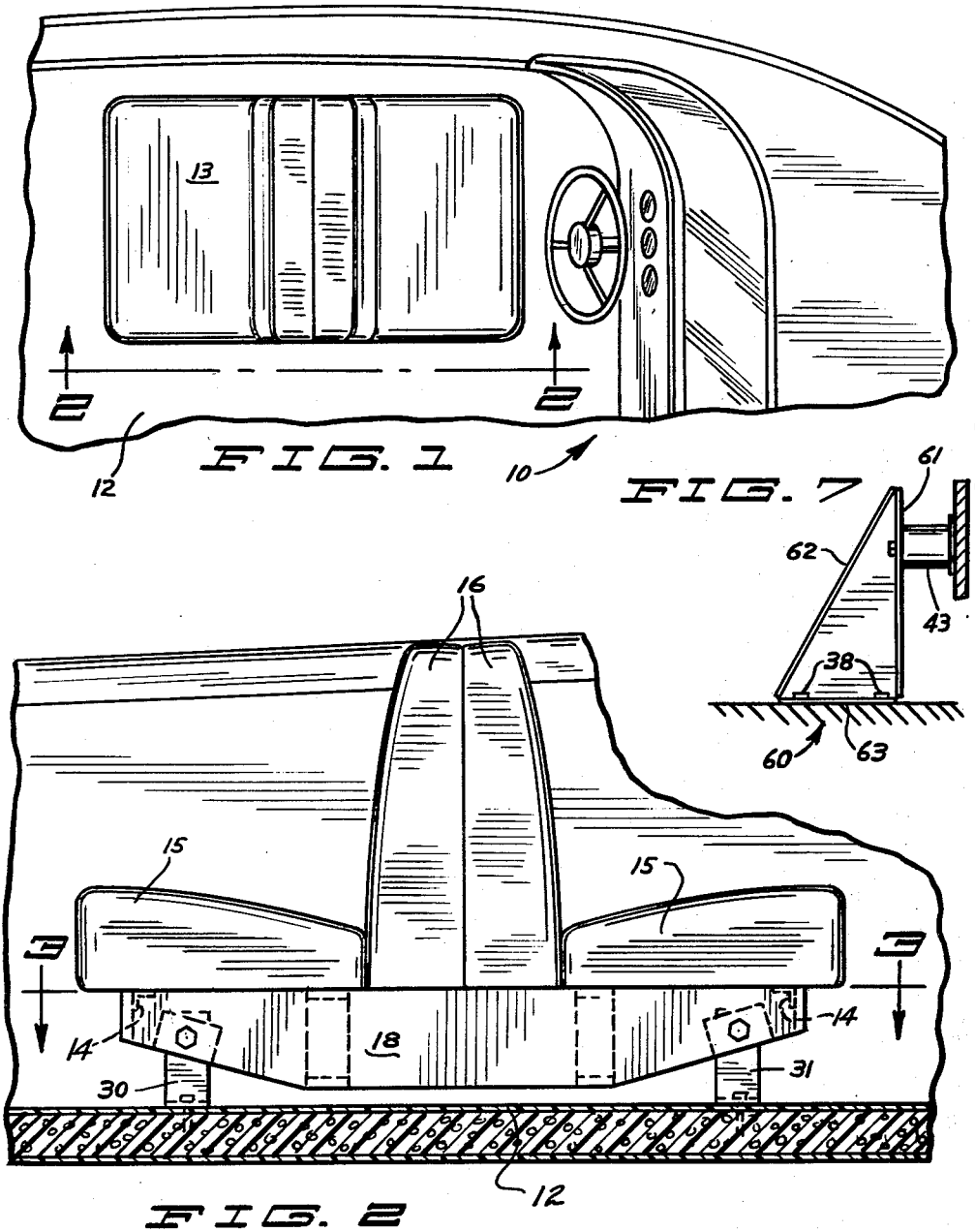

United States Patent Office 3,186,674
Patented June 1, 1965

3,186,674
BOAT SEAT SUSPENSION SYSTEM
Maurice H. O'Link, St. Cloud, Minn., assignor to Stearns Manufacturing Company, St. Cloud, Minn., a corporation of Minnesota
Filed May 28, 1963, Ser. No. 283,847
5 Claims. (Cl. 248—399)

This invention relates to an improvement in a suspension system for a boat seat with particular reference to an outboard or inboard type of cruiser within which seats may be installed as desired by the operator. There are suspension or mounting systems in use for boat seats, such as on the order of torsion bars which in cushioning the seat against shock tend to have substantial sway or rocking motion.

It is desirable to have a suspension system for boat seats wherein there are provided independent points of suspension with independent shock or vibration dampening effect at each point of suspension. It is desirable to have means for suspending a boat seat free of engagement with the boat deck with the suspension means effectively dampening shock or vibration at each point of suspension without having such effect travel generally throughout the seat.

It is an object of this invention therefore to provide a boat seat suspension system comprising a plurality of independent points of suspension for such seat, with means provided at each point of suspension to effectively dampen and localize the effect of shock or vibration.

It is another object of this invention to provide a suspension system for a boat seat wherein there is very little noticeable sway or movement of the seat generally.

It is a further object of this invention to provide a plurality of means for suspending a boat seat with each of said means comprising a universal shock dampening member responsive to side motion, backward and forward motion and vertical motion to effectively dampen and localize the effect of such motion at each point of suspension.

More specifically it is an object of this invention to provide deck supported brackets holding a boat seat in suspended position free of deck engagement with substantially rigid yet resilient mounting means connecting said brackets and said seat at a plurality of suspension points, with said mounting means comprising universal shock dampening members and having universal resistance.

These and other objects and advantages of the invention will be fully set forth in the following description made in connection with the accompanying drawings in which like reference characters refer to similar parts throughout the several views and in which:

FIG. 1 is a broken top plan view of a conventional type of boat showing a seat installed therein;

FIG. 2 is a view in longitudinal vertical section on an enlarged scale taken on line 2—2 of FIG. 1 as indicated;

FIG. 3 is a view in plan taken on line 3—3 of FIG. 2 as indicated;

FIG. 4 is a view in vertical section taken on line 4—4 of FIG. 3 as indicated;

FIG. 5 is a fragmentary view in vertical section on a magnified scale taken on line 5—5 of FIG. 3 as indicated;

FIG. 6 is a view in vertical section taken on line 6—6 of FIG. 4 as indicated; and FIG. 7 is a fragmentary view in side elevation showing showing a modification of a detail of applicant's construction.

With reference to the drawings and more specifically to FIGS. 1 and 2, a fragmentary view of a boat is indicated generally by the character 10, with a conventional type of seat 13 being indicated supported on the boat deck 12. With reference to FIG. 2, said seat 13 may be variously constructed and for purpose of illustration in connection with the applicant's invention, it is shown comprising cushioned seating portions 15 with adjacent upstanding backrest portions 16 therebetween carried on a supporting frame 18 and retained therein by depending flange portions 14. The seat 13 may be readily lifted off the supporting frame 18. In the present embodiment the specific construction of said seat forms no part of the applicant's invention.

Applicant's invention as here disclosed has to do more specifically with the support of the frame structure 18. However it is within the inventive concept herein that applicant's suspension system may be applied directly to an integral seat construction although in the specific embodiment here disclosed the suspension system is shown in connection with a seat supporting frame, such as frame 18.

Said supporting frame 18 may be variously constructed as to its specific details and is shown here comprising generally side walls 19 and 20 and end walls 21 and 22. It will be noted with respect to FIGS. 2 and 4 that the end portions of the side walls are tapered upwardly to accommodate the contours which are present in the deck construction of a boat. Reinforcing transverse members or struts 23 are shown extending between the side walls in longitudinally spaced relation supported by upstanding plate members 24 which are respectively secured to said side walls.

Positioned inwardly of either end of said frame member 18 are brackets 30 and 31 respectively. These brackets may be variously formed as to their specific construction, and in their present embodiment are shown as being substantially rectangular in the form of frame members of suitable width and of suitable gauge of material having upstanding side walls 34 and 35, a bottom wall 36 and an upper wall 37. Said members 30 and 31 are identical in construction and only a detailed description of the bracket 31 is herein set forth. Said brackets will be deck mounted being secured by bolts 38. Said brackets will have a length which will take up the greater portion of the distance between the side walls of the frame 18.

Extending between said brackets and the side walls of said frame 18 are mounting or connecting members 41, 42 and 43. Said connecting members may be variously formed of which a preferred embodiment of one of these is shown in some detail in FIG. 5. The body portion 46 of said connecting member 43 is indicated as being cylindrical and formed of a somewhat yielding resilient material, such as solid rubber of suitable character and having radial flexibility and axial compressibility and having a transverse or diametral dimension substantially equal to its length to provide a very effective universal shock dampening member which will be resiliently responsive to axially as well as radially directed vibration or shock to dampen the same. It is desirable to have said member 43 of construction that little motion if any is transmitted to the seat so that the effect of such shock or vibration to which a boat is normally subjected is negligible so far as being felt or experienced on the supported seat is concerned.

Said body portion 46 is here shown having concave or cup-shaped recessed end portions 47 having mounted therein conforming plate members 48, such as of metal, and having axial threaded bolt receiving projections as in the form of nuts 49. Bolts 52 and 53 respectively will be threaded into said nuts 49. Said bolt 52 will be disposed through the side walls of the brackets 30 and 31, as indicated in FIG. 5 in connection with side wall 35, and the bolts 53 will extend inwardly through the side walls of the supporting frame 18 to be threaded into their respective nuts 49. It is understood that members 41–43 are of identical construction.

With respect to FIGS. 4 and 6, it will be noted that the supporting frame 18 will be held by said brackets 30 and 31 and their respective connecting members 43 in suspended position free from engagement with the boat deck. Plates 39 are provided at the inner sides of the side walls of said supporting frame 18 against which the adjacent ends of the connecting members 43 will be drawn by the bolts 53. Thus each connecting member 43 forms an independent point of suspension.

With reference to FIG. 7, a modification is shown of a bracket structure wherein a triangular form of bracket 60 is indicated having a right-angled side wall 61 and an inclined side wall 62 with its base 63 secured to the boat deck as by bolts 38. Said brackets 60 will be provided at each point of suspension in connection with the supporting frame 18 or as in connection with a seat supported directly. The connecting members 43 will extend between the side wall 61 and the adjacent wall of said supporting frame 18. Thus here each bracket with its respective connecting member 60 forms in combination an independent bracket and suspension point.

Operation

Commonly used boat seats are rigidly mounted on a boat deck with all of the shock and vibration to which the boat is subjected being transmitted throughout the structure of the seat. Flexible mountings in use, such as torsion bars, result in substantial endwise or side sway in an effort to cushion shock or vibration.

The applicant provides an independent shock dampening member at each point of suspension with said shock dampening members having a universal flexibility to dampen shock or vibration equally from whatever direction. A solid rubber material has been found to provide an excellent dampening effect with such material having a tough quality of rigidity to prevent or avoid seat sway or a bouncing effect whereby the seat which is suspended is well stabilized and yet said material has a sufficient yielding quality or resilience to effectively dampen shock and vibration.

With reference to the modified bracket structure, this provides the convenience of locating the brackets conveniently.

With reference to the modified bracket structure, this provides the convenience of locating independent bracket and mounting members at each suspension point which provides greater flexibility than in the first embodiment where the brackets 30 and 31 must be of a size to correspond to the width of the supported seat or seat frame.

Applicant's seat suspension system has proved to be very effective and very satisfactory.

It will of course be understood that various changes may be made in the form, details, arrangement and proportions of the parts, without departing from the scope of applicant's invention which, generally stated, consists in a system capable of carrying out the objects above set forth, in the parts and combinations of parts disclosed and defined in the appended claims.

What is claimed is:

1. A boat seat suspension system having in combination,
a boat seat,
a supporting frame for said seat,
a pair of upstanding deck mounted brackets spaced longitudinally of said supporting frame and having upstanding sides spaced transversely of said supporting frame between the side walls thereof,
resilient mounting members horizontally disposed connecting the respective upstanding sides of said brackets and the adjacent side wall portions of said supporting frame holding said frame free from deck engagement,
said mounting members respectively comprising
a resilient member,
a pair of concave plate members respectively recessed in opposed sides of said resilient member to be disposed transversely of said supporting frame and made integral with said resilient member,
tapped studs integral with said plate members, and
bolts respectively extending through said upstanding sides of said brackets and through the side walls of said supporting frame and being threaded into said studs.

2. The structure set forth in claim 1,
said resilient member having a cross sectional dimension substantially equal to its length.

3. A boat seat suspension system having in combination,
a boat seat,
a supporting frame for said seat,
a pair of upstanding deck mounted brackets spaced longitudinally of said supporting frame and having upstanding sides spaced transversely of said supporting frame between the side walls thereof,
resilient mounting members horizontally disposed connecting the respective upstanding sides of said brackets and the adjacent side wall portions of said supporting frame holding said frame free from deck engagement,
said mounting members respectively comprising
a cylindrical resilient member having its axis disposed in a direction transversely of said supporting frame,
a pair of concave rigid plate members recessed in the ends of said resilient member and made integral therewith,
means removably securing said respective concave plate members with the adjacent portions of said upstanding sides of said brackets and of said side wall portions of said supporting frame.

4. The structure set forth in claim 3,
said plate members having portions tapped axially of said resilient member, and
said last mentioned means comprising bolts extending through said upstanding sides of said bracket and said side wall portions of said supporting frame.

5. The structure set forth in claim 3,
said resilient member having a diametral dimension substantially equal to its length.

References Cited by the Examiner

UNITED STATES PATENTS

| | | | |
|---|---|---|---|
| 1,703,297 | 2/29 | Chase | 248—358 |
| 1,732,647 | 10/29 | Flintermann | 248—358 |
| 1,775,517 | 9/30 | Flintermann | 248—358 |
| 2,460,596 | 2/49 | Roche | 248—358 |
| 2,787,315 | 4/57 | Siebert | 9—7 |
| 2,971,568 | 2/61 | Rorie et al. | 297—244 |
| 2,993,529 | 7/61 | Brown | 297—244 |
| 2,993,673 | 7/61 | Villar | 248—358 |

CLAUDE A. LE ROY, *Primary Examiner.*